(12) United States Patent
Matuura

(10) Patent No.: US 9,434,550 B1
(45) Date of Patent: Sep. 6, 2016

(54) VIBRATING CONVEYOR

(71) Applicant: TIF Corporation, Yoshida-cho, Haibara-gun, Shizuoka-ken (JP)

(72) Inventor: Takahiro Matuura, Shizuoka-ken (JP)

(73) Assignee: TIF CORPORATION, Yoshida-Cho, Haibara-Gun, Shizuoka-Ken (JP)

( * ) Notice: Subject to any disclaimer, the term of this patent is extended or adjusted under 35 U.S.C. 154(b) by 0 days.

(21) Appl. No.: 14/699,229

(22) Filed: Apr. 29, 2015

(51) Int. Cl.
*B65G 27/32* (2006.01)
*B65G 27/12* (2006.01)
*B65G 27/18* (2006.01)

(52) U.S. Cl.
CPC ................. *B65G 27/32* (2013.01)

(58) Field of Classification Search
None
See application file for complete search history.

(56) References Cited

U.S. PATENT DOCUMENTS

| | | | | |
|---|---|---|---|---|
| 3,212,630 A | * | 10/1965 | Allen | B65G 27/00 198/750.7 |
| 3,421,637 A | * | 1/1969 | Sofy | B21D 43/055 198/621.1 |

\* cited by examiner

*Primary Examiner* — Kavel Singh
(74) *Attorney, Agent, or Firm* — Egbert Law Offices, PLLC

(57) ABSTRACT

A supporting means of a trough has a lever assembly with a base lever and a vibration lever respectively rotatably connected together at lower ends thereof by a common connecting shaft. The base lever is rotatably supported through a first shaft by a frame. The vibration lever is rotatably connected through a second shaft with the trough. The vibration lever is swingably held through spring means by the base lever. The direction in which the object on the trough is conveyed is reversed by rotating the lever assembly partly around the first shaft of the base lever so as to change the angle of inclination of the lever assembly with regard to the lengthwise direction of the trough between a first angle "A" at which the object on the trough moves in a certain direction and a second angle "B" at which the object moves in an opposite direction.

3 Claims, 6 Drawing Sheets

VIBRATING CONVEYOR

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a vibrating conveyor. More particularly, the invention relates to a vibrating conveyor adapted to reverse the direction in which the object on a trough is conveyed.

2. Description of Related Art Including Information Disclosed Under 37 CFR 1.97 and 37 CFR 1.98

Japanese Patent Laid-Open Publication No. Hei 10-197154 discloses a vibrating conveyor (hereinafter referred to as "conventional vibrating conveyor"). As shown in a part of FIG. 7 of the present patent application, the conventional vibrating conveyor comprises a frame 11, said frame 11 supporting a trough 5 by supporting means 6 so that said trough 5 vibrates forwardly and backwardly, said trough 5 being vibrated by vibrating means.

In the conventional vibrating conveyor, the object on the trough 5 is conveyed in a certain direction only, said certain direction being decided by the direction of inclination of the supporting means 6 with regard to the lengthwise direction of the trough 5. In other words, in the conventional vibrating conveyor, it is not possible to reverse the direction in which the object on the trough is conveyed.

Therefore, if the object is to be conveyed in one direction and the opposite direction alternately, it will be necessary to dispose, for example as shown in FIG. 7, a vibrating conveyor 1 for conveying the object in one direction and another vibrating conveyor 3 for conveying the object in the opposite direction so that the upstream sides 1a, 3a thereof in the direction of conveyance are in the vicinity of one another, a sorter 4a of an object feeder 4 being disposed in the vicinity of said upstream sides 1a, 3a of said vibrating conveyors 1, 3, thereby the object fed by the object feeder 4 is sorted by the sorter 4a and supplied onto either of said upstream sides 1a, 3a of said vibrating conveyors 1, 3.

Thus, in the conventional vibrating conveyor, if the object is to be conveyed in one direction and the opposite direction alternately, it is necessary to use two vibrating conveyors and an object feeder having a sorter, which involve additional cost and need large floor space.

BRIEF SUMMARY OF THE INVENTION

It is an object of the invention to provide a vibrating conveyor adapted to reverse the direction in which the object on a trough is conveyed.

It is another object of the invention to provide a vibrating conveyor which is less expensive and need smaller floor space.

These and other objects have been attained by the following vibrating conveyor:

A vibrating conveyor comprising a frame, said frame supporting a trough by supporting means so that said trough vibrates forwardly and backwardly, said trough being vibrated by vibrating means, said supporting means having a lever assembly comprising abase lever and a vibration lever, said base lever and vibration lever being respectively rotatably connected together at lower ends thereof by a common connecting shaft, said base lever being rotatably supported at an upper end thereof through a first shaft by said frame, said vibration lever being rotatably connected at an upper end thereof through a second shaft with said trough, said base lever being provided at each of side edges thereof with a block, spring means being attached between each of said blocks of said base lever and each of side edges of said vibration lever, thereby said vibration lever being held through said spring means by said base lever so as to be swingable around said connecting shaft, the direction in which the object on said trough is conveyed being reversed by rotating said lever assembly partly around said first shaft of said base lever so as to change the angle of inclination of said lever assembly with regard to the lengthwise direction of said trough between a first angle at which the object on said trough moves in a certain direction and a second angle at which the object on said trough moves in an opposite direction.

The distance between a center line of said first shaft and a center line of said second shaft is preferably less than 20 mm.

More preferably, said center line of said first shaft and said center line of said second shaft is substantially collinear.

The present invention has the following advantageous effects:

Since the direction in which the object on said trough is conveyed can be reversed by changing the angle of inclination of said lever assembly between said first angle and said second angle, it is possible to convey the object in one direction and the opposite direction alternately by means of a single vibrating conveyor only and without a sorter. Therefore, according to the present invention, it is possible to reduce the cost of equipment and the floor space therefor.

Where the distance between a center line of said first shaft and a center line of said second shaft is less than 20 mm, the reciprocating motion of the trough by the vibrating means is kept substantially constant.

Where said center line of said first shaft and said center line of said second shaft is substantially collinear, the reciprocating motion of the trough by the vibrating means is kept constant.

DETAILED DESCRIPTION OF THE INVENTION

Figure 1:
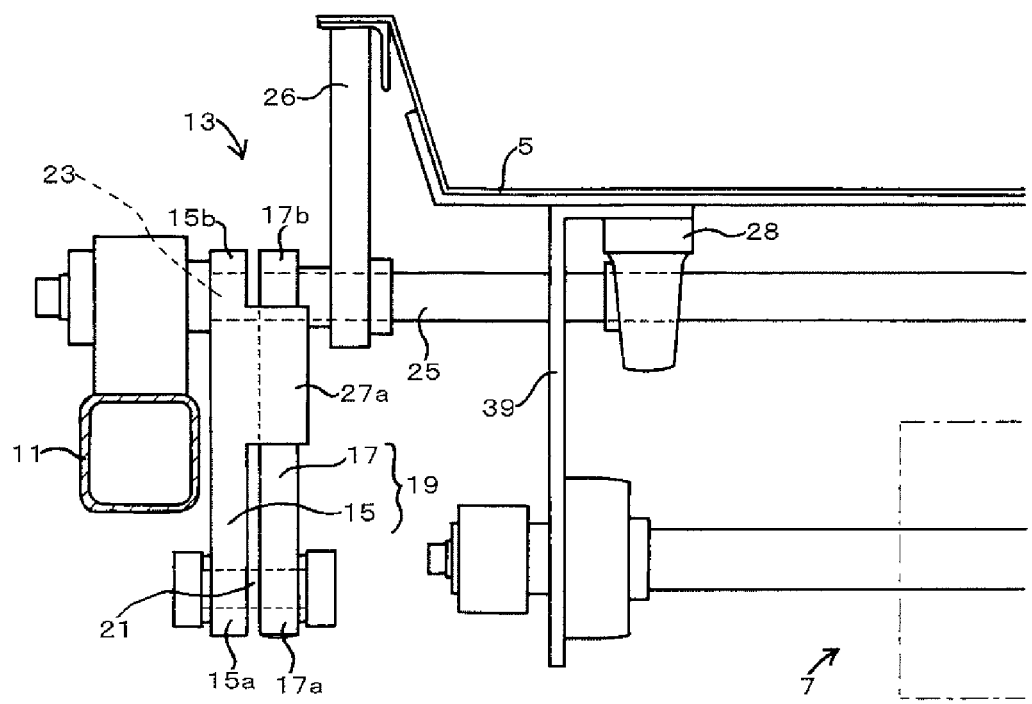
FIG. 1 is a front view showing an example of a supporting means in a vibrating conveyor according to the present invention.

The present invention will now be described in detail with reference to the attached drawings.

A vibrating conveyor according to the present invention comprises a frame 11, said frame 11 supporting a trough 5 by supporting means 13 so that said trough 5 vibrates forwardly and backwardly, said trough 5 being vibrated by vibrating means 7. In these points, the vibrating conveyor according to the present invention is the same as the above-mentioned conventional vibrating conveyor.

The trough 5 is a means for conveying the object and has a concave section, for example.

In the present invention, the supporting means 13 has a lever assembly 19 comprising a base lever 15 and a vibration lever 17. The base lever 15 and the vibration lever 17 are respectively rotatably connected together at lower ends 15a, 17a thereof by a common connecting shaft 21. The base lever 15 is rotatably supported at an upper end 15b thereof through a first shaft 23 by the frame 11. The vibration lever 17 is rotatably connected at an upper end 17b thereof through a second shaft 25 with the trough 5. Connecting means 26, 28 connect the second shaft 25 with the trough 5.

The base lever 15 is provided at each of side edges 15c, 15d thereof with a block 27a, 27b. Spring means 29a, 29b are attached between each of the blocks 27a, 27b of said base lever 15 and each of side edges 17c, 17d of said vibration lever 17. Thereby, said vibration lever 17 is swingably held through said spring means 29a, 29b by said base lever 15. That is, the vibration lever 17 is held by the base lever 15 so as to be swingable around said connecting shaft 21. Thus, the base lever 15 and the vibration lever 17 are united and assume substantially the same posture so as to form said lever assembly 19. Said spring means 29a, 29b may be, for example, rubber, urethane rubber, or air spring.

Figure 3:
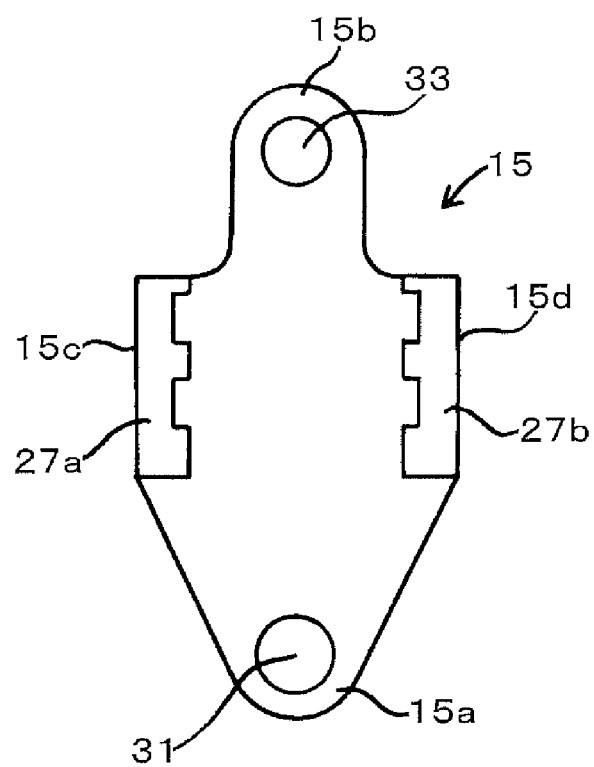
FIG. 3 is a side view showing an example of a base lever in said lever assembly.
Figure 4:
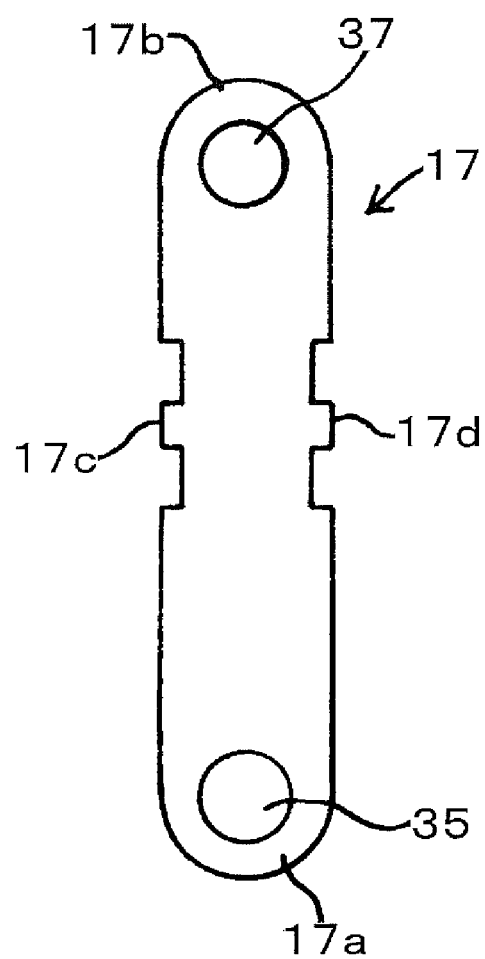
FIG. 4 is a side view showing an example of a vibrating lever in said lever assembly.

As shown in FIG. 3, the base lever 15 has a hole 31 through which said connecting shaft 21 is passed, and another hole 33 which receives said first shaft 23. As shown in FIG. 4, the vibration lever 17 has a hole 35 through which said connecting shaft 21 is passed, and another hole 37 which receives said second shaft 25.

Figure 2:
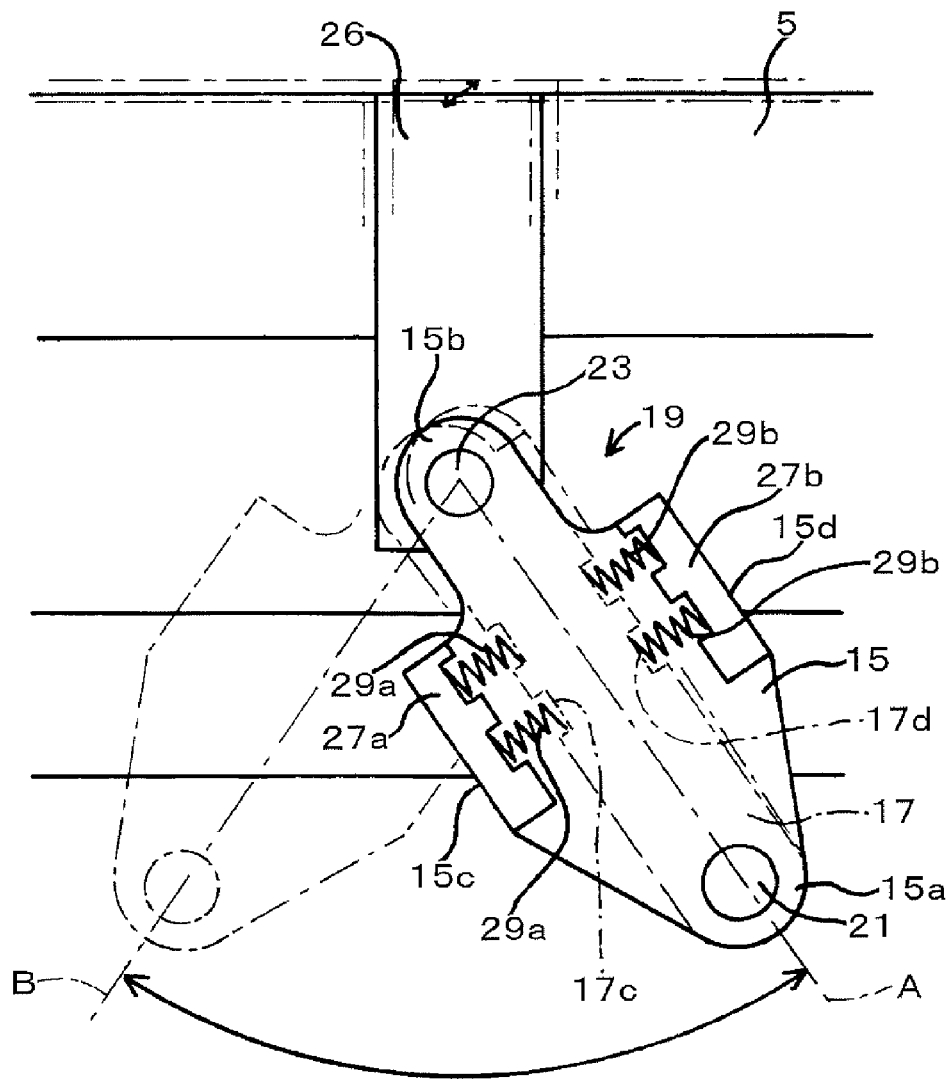
FIG. 2 is a schematic side view showing an example of a lever assembly in said supporting means.

As shown in FIG. 2, the direction in which the object on said trough 5 is conveyed is reversed by rotating said lever assembly 19 partly around said first shaft 23 of the base lever 15 so as to change the angle of inclination of the lever assembly 19 with regard to the lengthwise direction of the trough 5 between a first angle "A" at which the object on the trough 5 moves in a certain direction and a second angle "B" at which the object on the trough 5 moves in an opposite direction. When the lever assembly 19 is at said first angle "A", the trough 5 is vibrated in a certain direction and the object on the trough 5 is conveyed in a direction corresponding thereto. When the lever assembly 19 is at said second angle "B", the trough 5 is vibrated in the opposite direction and the object on the trough 5 is conveyed in the opposite direction corresponding thereto. Thus, it is possible to reverse the direction in which the object on the trough 5 is conveyed by changing the angle of inclination of the lever assembly 19 between said first angle "A" and said second angle "B".

The vibrating means 7 for vibrating the trough 5 may be, for example, a vibrator or eccentric mechanism driven by an electric motor. In FIG. 1, vibration caused by the vibrating means 7 is transmitted through a vibration transmitting means 39 to the trough 5.

A plurality of said supporting means 13 are disposed on both sides of the trough 5. The angle of inclination of each lever assembly 19 may be changed between said first angle "A" and said second angle "B", for example, by means of an actuator 41 such as an air cylinder.

Figure 5:
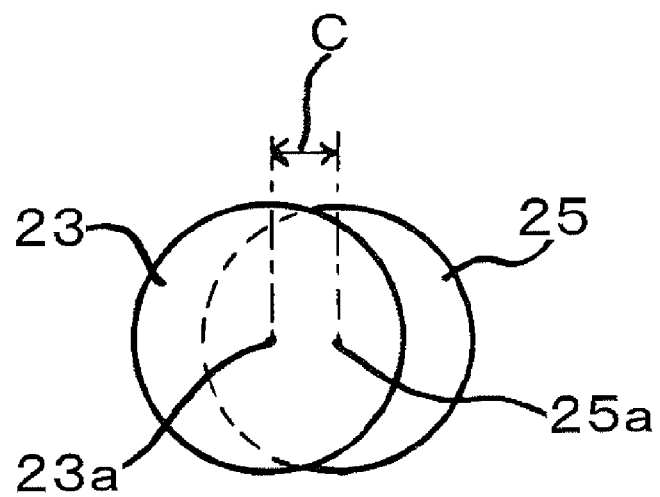
FIG. 5 is a schematic illustration of a distance between a center line of a first shaft and a center line of a second shaft.
Figure 6:
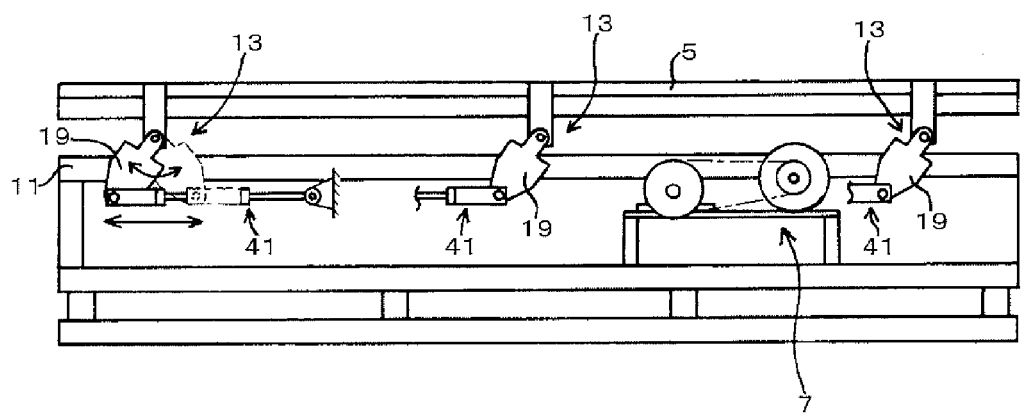
FIG. 6 is a schematic side view showing an example of a vibrating conveyor according to the present invention.
Figure 7:
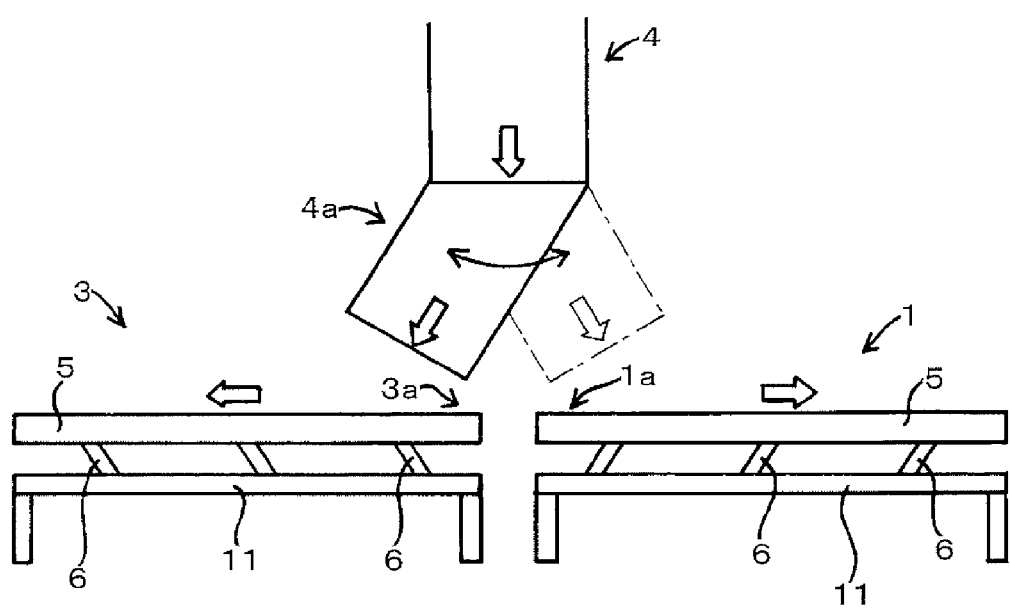
FIG. 7 is a schematic illustration of a conventional vibrating conveyor.

The distance "C" between a center line 23a of said first shaft 23 and a center line 25a of said second shaft 25 is preferably less than 20 mm. See FIG. 5.

More preferably, said center line 23a of said first shaft 23 and said center line 25a of said second shaft 25 is substantially collinear. See FIG. 5.

As many apparently widely different embodiments of the present invention may be made without departing from the spirit and scope thereof, it is to be understood that the invention is not limited to the specific embodiments thereof except as defined in the appended claims.

I claim:

1. A vibrating conveyor apparatus for conveying an object, said vibrating apparatus comprising:
   a trough;
   a frame supporting said trough by a supporting structure; and
   a vibrator connected to said trough so that said trough vibrates forwardly and backwardly, said supporting structure comprising;
   a lever assembly having a base lever and a vibration lever, said base layer and said vibration lever the respectively rotatably connected together at lower ends thereof by a common connecting shaft, said base lever being rotatably supported at an upper end thereof through a first shaft by said frame, said vibration lever being rotatably connected to an upper end thereof through a second shaft with said trough, said base lever having a block at each side edge thereof, a spring being attached between each of the blocks of said base lever and each of side edges of said vibration lever, said vibration lever being held by said base lever through said spring so as to be switchable around said common connecting shaft, a direction in which the object on said trough is conveyed being reversed by rotating said lever assembly partly around said first shaft of said base layer so as to change an angle of inclination of said lever assembly with respect to a lengthwise direction of said trough between a first angle at which the object moves on said trough in one direction and a second angle at which the object moves on said trough and an opposite direction.

2. The vibrating conveyor apparatus of claim 1, wherein a distance between a centerline of said first shaft and a center line of said second shaft is less than 20 millimeters.

3. The vibrating conveyor apparatus of claim 1, wherein a center line of said first shaft and a center line of said second shaft are substantially collinear.

* * * * *